United States Patent [19]
Judkins et al.

[11] Patent Number: 6,033,697
[45] Date of Patent: Mar. 7, 2000

[54] COATED FROZEN PAR-FRIED POTATO STRIPS

[75] Inventors: Carlton Judkins; Richard K. Pinegar, both of Moses Lake, Wash.

[73] Assignee: Nestec S.A., Vevey, Switzerland

[21] Appl. No.: 09/237,985

[22] Filed: Jan. 25, 1999

Related U.S. Application Data

[62] Division of application No. 08/870,321, Jun. 6, 1997, Pat. No. 5,885,639.

[51] Int. Cl.⁷ ..................................................... A23L 1/217
[52] U.S. Cl. ............................................. 426/102; 426/637
[58] Field of Search ..................................... 426/102, 302, 426/303, 637, 438, 441

[56] References Cited

U.S. PATENT DOCUMENTS

| | | | |
|---|---|---|---|
| 4,254,153 | 3/1981 | Ross et al. | 426/441 |
| 4,542,030 | 9/1985 | Haury et al. | 426/262 |
| 4,590,080 | 5/1986 | Pinegar | 426/441 |
| 5,059,435 | 10/1991 | Sloan et al. | 426/102 |
| 5,141,759 | 8/1992 | Sloan et al. | 426/102 |
| 5,206,048 | 4/1993 | Shin et al. | 426/637 |
| 5,242,699 | 9/1993 | Bednar et al. | 426/302 |
| 5,279,840 | 1/1994 | Baisier et al. | 426/102 |
| 5,281,432 | 1/1994 | Zallie et al. | 426/549 |
| 5,302,410 | 4/1994 | Calder et al. | 426/637 |
| 5,312,631 | 5/1994 | Yamashita | 426/52 |
| 5,328,704 | 7/1994 | Ritch | 426/102 |
| 5,372,829 | 12/1994 | Chalupa et al. | 426/293 |
| 5,393,552 | 2/1995 | Busacker et al. | 426/637 |
| 5,431,944 | 7/1995 | Melvej | 426/552 |
| 5,527,549 | 6/1996 | Bernacchi et al. | 426/89 |
| 5,620,727 | 4/1997 | Gerrish et al. | 426/302 |
| 5,622,741 | 4/1997 | Stubbs et al. | 426/243 |

*Primary Examiner*—Arthur L. Corbin

[57] ABSTRACT

Potato strips, which are cut from raw potatoes and blanched, are contacted with an aqueous solution containing one or more hydrocolloids to deposit a hydrocolloid layer on the surface of the strips. The potato strips preferably are partially dried before being contacted with an aqueous starch-based slurry to provide a starch-based batter coating over the hydrocolloid layer. The potato strips having the dual coating of a hydrocolloid and a batter, are then parfried and frozen. When reconstituted by finish frying in hot oil, the resulting french fries have an extended holding quality, remaining crisp and tender for prolonged periods after finish frying.

5 Claims, No Drawings

COATED FROZEN PAR-FRIED POTATO STRIPS

This application is a divisional of Ser. No. 08/870,321, filed Jun. 6, 1997, now U.S. Pat. No. 5,885,639.

BACKGROUND OF THE INVENTION

This invention relates to the preparation of partially fried, frozen potato strips which have extended holding quality after finish frying. More particularly, the invention relates to the preparation of frozen, par fried potato strips which exhibit a crisp but tender exterior surface for extended periods of time after finish frying Control of the textural properties of french fries after finish frying is of great concern to operators of fast food restaurants. Typically, french fries served by fast food restaurants are prepared by finish frying frozen partially fried (i.e., parfried) potato strips in fat or oil. Desirably such parfried and frozen potato strips, after finish frying, exhibit a crisp and tender exterior surface and a fluffy, mealy inner core. However, parfried potato strips presently available suffer from the disadvantage that when finish fried for consumption, they lose their desired crispness within a relatively short period of time and tend to become limp and soggy. This change in texture is due to the migration of internal moisture within the fried strips into the outer surface of the potato strips. Such migration of moisture is accelerated by holding the potato strips, after finish frying, under a heat lamp, a practice commonly used by fast food operators to maintain the french fries at desired serving temperature.

A number of procedures have been proposed heretofore for extending the holding time of french fries, so that the french fries remain crisp and tender for extended periods of time after finish frying, even when held under a heat lamp. For example, U.S. Pat. No. 3,597,227 discloses coating the surface of potato strips with an aqueous dispersion of a high amylose starch prior to deep frying to improve the crispness of finish fried potato strips. U.S. Pat. No. 5,141,759 discloses that potato strips having increased crispness and extended holding time after finish frying are produced by coating the strips, prior to parfrying, with an aqueous starch slurry containing chemically modified ungelatinized potato starch, chemically modified ungelatinized corn starch and rice flour. U.S. Pat. No. 5,302,410 discloses providing blanched potato strips with a "glaze" coating of an aqueous solution having a pH 5.5–8.5 and containing hydrolyzed starch having a DE of less than 12, to provide parfries which retain crispness for an extended period after finish frying. U.S. Pat. No. 5,431,944 discloses the production of french fries having a crispy texture by coating blanched potato strips with a batter mix containing a leavening agent, a blend of starch and high amylose starch, dextrin and a food gum. U.S. Pat. No. 5,622,741 discloses that potato strips having an extended hold time after finish frying are produced by coating blanched potato strips with an aqueous slurry containing corn flour, corn starch and low solubility dextrin.

Some of these prior art procedures have been more effective than others in providing potato strips which retain desired textural characteristics for an extended period after finish frying. However, all of these prior procedures suffer from disadvantages which limit their acceptability to fast food restaurant operators. For example, batter coatings used heretofore, even those designated as thin-coat batters, have a relatively high solids content and deposit a relatively thick batter coating on the surface of the potato strips. Although the batter coated strips have a crisp texture after finish frying, they develop an undesirable degree of toughness and chewiness during holding. Moreover, the batter coating detracts from the natural potato flavor of the product and forms a discernible coating layer on the surface of the french fries to detract from the natural appearance of the finish fried potato strips. The use of batter coatings having a low solids content has not been feasible since such low solids content batters have reduced adherence to the surface of the potato strips and tend to dissociate from the potato strips during parfrying and/or finish frying. While the "glaze" coating on potato strips disclosed in the '410 patent is effective in extending crispness of french fries after finish frying without the development of toughness and chewiness, such "glaze" coatings are not as crisp as batter coated french fries.

SUMMARY OF THE INVENTION

The present invention provides parfried potato strips which retain a crisp, tender surface texture and a fluffy mealy inner core, without becoming tough and chewy, for extended periods of time after finish frying. Parfried potato strips having such textural characteristics are prepared by providing blanched potato strips with a dual coating prior to parfrying, that is, an initial glaze coating of an aqueous hydrocolloid solution, followed by a subsequent coating of an aqueous batter slurry, with the batter slurry preferably having a relatively low solids content.

In accordance with this invention, raw potatoes are washed, cut into strips of a desired size and blanched in accordance with well known procedures, such as those disclosed in U.S. Pat. No. 4,254,153 to Ross et al. After blanching, the potato strips are contacted with an aqueous solution of one or more hydrocolloids, such as natural or modified food gums, gelatin, pectins, starches, modified starches, high amylose starches, dextrins, maltodextrins, and the like. The pH of the hydrocolloid solution is maintained at a level in the range of 5.0 to 8.5 by any suitable means, such as the addition of an edible basic salt, preferably tetrasodium pyrophosphate (TSPP), to the hydrocolloid solution. Conventional ingredients, including a sequestering agent such as sodium acid pyrophosphate (SAPP), a reducing sugar such as dextrose, a flavor enhancer such as sodium chloride, and a leavening agent, may, if desired also be included in the aqueous hydrocolloid solution. Preferably, the hydrocolloid-coated potato strips are heated to reduce the internal moisture of the strips and to set the hydrocolloid coating on the surface of the strips. The potato strips are then coated with an aqueous starch-based batter with the batter typically being applied by either immersing the potato strips in the starch-based slurry, or spraying the slurry onto the surface of the potato strips. The batter coated strips are drained to remove excess batter coating, and the batter coated potato strips are parfried and frozen in accordance with known procedures.

The aqueous starch slurry used in the present invention may have a relatively low solids content, which may be substantially lower than conventional starch-based batters even the so-called thin-coat batter coatings. For example, product having the desired characteristics of this invention may be produced using a starch-based batter having a solids content as low as about 5%. The use of such a low solids content batter results in a reduced level of batter solids on the potato strips. Due to the presence of the initial hydrocolloid coating, a starch based batter slurry having such a relatively low solids levels can be used and still provide parfried potato strips having a crisp, tender surface layer for prolonged periods of time after finish frying. Moreover, with the initial hydrocolloid layer, a batter coating having a relatively low solids level can be used without separating from the potato strips during parfrying, finish frying or handling.

The french fries prepared by finish frying the parfried potato strips of this invention have a superior texture and color and are characterized by a crisp surface layer and mealy interior. The french fries remain crisp and tender for prolonged periods after finish frying without developing the toughness and chewiness typically exhibited by conventional batter coated french fries upon holding.

DETAILED DESCRIPTION OF THE INVENTION

Raw potatoes, preferably of the Russet-Burbank variety, are washed and sorted to remove defective potatoes, and are then optionally peeled. If a finished product with peel remaining is desired, the peeling step is omitted. The whole potatoes are optionally preheated for about 20–40 minutes at a temperature between about 110° F. to 150° F. (43° C. to 65° C.) and are then cut into strips of desired size and shape customarily used for french fries, such as shoestring potato strips, crinkle cut strips, and straight cut strips, which may range from about 0.25 inch (6.35 mm) to about 0.5 inch (12.7 mm) square in cross-section, or into larger cuts. After cutting, the strips may be washed to remove surface starch. The potato strips are then blanched according to conventional procedures to inactivate enzymes, gelatinize the starch and remove excess free sugars which might cause uncontrolled browning. Typically the strips are blanched by immersion in hot water at about 160° F.–210° F. (71° C.–99° C.,) for 2–15 minutes, with a temperature of 170° F.–190° F. (76°–88° C.,) for 4–10 minutes being preferred. Alternatively, the potato strips may be blanched in steam at atmospheric pressure for about 2–10 minutes.

After blanching, the potato strips are contacted with an aqueous solution containing one or more hydrocolloids, with the hydrocolloid solution having a pH in the range of about 5.0 to 8.5, preferably from 6.5 to 7.5. Contacting the potato strips with the hydrocolloid solution having a pH in this range, such as by spraying, dipping, immersion, and the like, forms a thin hydrocolloid coating or glaze on the surface of the potato strips which not only promotes increased crispness of the potato strips on finish frying, but also promotes improved adhesion of the subsequently applied batter layer, even batter coatings having a relatively low level of solids. That is, the hydocolloid coating provides the potato strips with a surface which enables the subsequent batter coating to more firmly adhere, particularly batter coatings having a relatively slow solids concentration.

Suitable hydrocolloids which may be used include food gums, gelatin, pectins, starches, modified starches, high amylose starches, dextrins, maltodextrins, and the like. Suitable food gums which may be used include methyl cellulose, guar gum, xanthan gum, gum arabic, carrageenan, locust bean gum, and similar food gums, and mixtures thereof. When a food gum is used as the hydrocolloid, it is present in an omount of from about 0.05% to 1.0% by weight of the aqueous solution. When hydrocolloids other than a food gum are used, they are used at a concentration in the aqueous solution of from about 0.5% to 12.0% by weight, preferably between 2% and 6% by weight of the aqueous solution. Hydrolyzed starch products, such as dextrins and maltodextrins having a Dextrose Equivalent (DE) value of less than about 12, are preferred for use as the hydrocolloid in coating the potato strips. Suitable maltodextrins include potato maltodextrins and corn maltodextrins.

The pH of the aqueous hydrocolloid solution is maintained in the range of between 5.0 and 8.5, preferably between 6.5 and 7.5, by the addition of a basic alkali salt to the solution. Tetrasodium pyrophosphate (TSPP) is generally preferred, but any basic alkali salt which is suitable for use in food products in the amount required to adjust the pH of the aqueous solution to the desired range may be used. Maintaining the pH of the hydrocolloid solution within this range has been found to enhance the crisp, tender characteristics of the potato strips after subsequent batter coating and finish frying.

If desired, a conventional food-grade sequestering agent, such as sodium acid pyrophosphate (SAPP) may be included in the aqueous hydrocolloid solution, in order to minimize product discoloration. If SAPP is used, it is usually present in amounts of about 0.2% to 1.0% by weight. The aqueous solution may also contain from 0.1% to about 1.0% by weight of a reducing sugar, such as dextrose, to facilitate uniform color development during frying. Other conventional materials may also be included in the aqueous solution, such as, for example, salt or other flavor enhancers, leavening agents, and the like.

The aqueous hydrocolloid solution is maintained at a temperature of between about 130° F. to 180° F. (54° C. to 71° C.) when contacted with the blanched potato strips. The blanched strips are contacted with the aqueous hydrocolloid solution by immersing the strips in a dip tank containing the solution for a period of time sufficient to coat the strips with hydrocolloid, typically from about 10 to 60 seconds. Other procedures may, of course, be used, such as contacting the strips with the aqueous solution in a flume or tube, spraying the solution onto the strips, and the like.

Following the application of the hydrocolloid solution, the hydrocolloid-coated potato strips preferably are heated under time-temperature conditions sufficient to partially dry the potato strips, that is, to accomplish a moisture loss of up to about 25% from the strips and to set the hydrocolloid coating on the surface of the potato strips. The level of moisture loss will, of course, depend to a large extent on the size cut of the potato strips. For shoestring cuts, a moisture loss in the range of from 12% to 16% is desirable. Suitable product may be produced without drying the hydrocolloid-coated strips. If the potato strips are dried, they are preferably subjected to heated air, in a conventional hot air drier, at a temperature of from about 130° F. to 350° F. (54° C.–177° C.) for from 5 to 40 minutes.

The potato strips, having a hydrocolloid layer on the surface of the strips, are then coated with an aqueous starch slurry, by contacting the strips, such as by dipping, immersion or spraying, with an aqueous starch-based batter to form a starch coating or batter coating over the hydrocolloid layer on the strips. Excellent results are obtained with a starch-based slurry having a solids content as low as about 5% by weight. Starch-based slurries having a higher solids content, up to 50% or more may, of course be used. However, as the solids concentration in the starch slurry is increased, particularly as it increases above about 30% by weight, french fries produced from the coated strips become less tender and more chewy than those produced using a lower solids content starch slurry. Preferably, the potato strips pick up between about 8 to 14 percent of their weight in starch slurry.

The starch slurry may contain one or more starches and flours typically used in the batter coating of potato strips, including, for example, corn flour, wheat flour, rice flour, dextrin, starch, modified food starch such as modified potato starch, modified corn starch, and the like. In addition, the slurry may also contain minor amounts of other ingredients, such as whey, sodium chloride, a leavening agent (typically a carbonate salt and a leavening acid such as sodium acid pyrophosphate), and a food gum. For example, whey can be included to promote the development of golden brown color upon frying. Food gums provide viscosity control and help maintain the solids in suspension in the slurry, particularly when slurries having a relatively low solids content are used. Suitable dry starch blends which have been found to be particularly effective are obtained from Bunge Foods Corporation, Bradley, Ill. under the designations LS-C and Clear Choice Type A .The dry batter blend LS-C has been identified by the supplier as modified food starch, rice flour, salt, leavening (sodium acid pyrophosphate and sodium bicarbonate), cornstarch, xanthan gum, beta carotene and whey. As identified by the supplier, the composition of dry batter blend Clear Choice Type A is modified food starch, tapioca dextrin, salt, corn starch, leavening (sodium acid pyrophosphate and sodium bicarbonate), whey and xanthan gum.

The batter coating slurry is prepared by blending the dry ingredients, typically , one or more starches, modified or unmodified, and flours, and dextrin, and other optional ingredients such as whey, leavening, salt, and flavorings, and then adding the dry blend, with agitation, to the amount of ambient temperature water necessary to give a slurry having the desired solids content. The starch slurry is maintained at a temperature between about 40° F. to 75° F. (4.4° C. to 24° C.), preferably between 60° F. to 70° F. (15.6° C.–21.0° C.) while the slurry is mixed and during coating.

Typically, conventional starch-based batter slurries used in prior coating procedures for french fries have a relatively high solids level, on the order of 40% or more. The use of batter coatings having a relatively low solids content has not been considered feasible due to poor adhesion of the batter coating to the potato substrate, with the result that the batter coating tends to "blow off" or separate from the substrate upon par frying or finish frying of the potato strips. In accordance with the present invention, however, the batter coating exhibits excellent adhesion to the potato strip substrate even when the aqueous starch slurry has a low solids content, thaty is on the order of about 5% by weight. The initial hydrocolloid coating on the surface of the blanched strips provides a surface for increased adherence of the subsequent starch coating, even when the starch slurry has a relatively low solids level. Batter pick-up on the potato strips is reduced due to the use of the starch slurry having a reduced solids content, with the result that the resulting potato strips, after parfrying and finish frying, have less tendency to develop tough, chewy characteristics upon holding.

The aqueous starch slurry may be applied by any suitable means, such as by dipping, spraying or immersion. After coating with the starch slurry, excess starch slurry is removed from the potato strips by draining the strips or by brief use of an air knife.

The potato strips are then parfried in oil at a temperature of about 325° F. to 390° F. (162° C. to 199° C.) for a short period of time, about 20 to 90 seconds. The par-fried strips are frozen, packaged and stored for subsequent use. To prepare the parfried strips for consumption, they are finish fried in deep fat or oil bath at a temperature of about 300° F. to 375° F. (149° C. to 190° C.) for 1.5 to 3.5 minutes to develop color and crispness. The resulting potato strips are light golden brown in color, and have a crisp, tender surface and a puffy mealy inner core upon finish frying. Such finish fried potato strips produced in accordance with this invention, retain their crisp, tender outer layer over extended periods of time under a heat lamp, without developing an undesirable tough, chewy characteristic, common with conventional batter-coated french fries.

The following examples are intended to illustrate, but not to limit, the present invention. Unless otherwise indicated, all parts and percentages are by weight.

EXAMPLE I

A series of tests was run to demonstrate the effect of the present invention on the textural characteristics of french fries held under a heat lamp over an extended period of time. To provide a basis for comparison, four tests were run. Each of these four tests utilized potato strips obtained from Russet Burbank potatoes which had been steam-peeled, heated for from 28 to 34 minutes at a temperature in the range of from 117° F. to 126° F., cut into strips about 0.3 inches (0.8 cm.) in cross-section, and water blanched for 6.5 minutes at 180° F.

In Test 1A the potato strips were processed into parfried strips using conventional procedure, with the strips having no hydocolloid coating or starch-based batter coating. That is, the blanched potato strips were immersed for 40 seconds in an aqueous solution containing 0.5 percent by weight sodium acid pyrophosphate (SAPP) and 0.3 percent by weight dextrose. The solution was maintained at 160° F. After removal from the solution, the strips were dried in a conventional drier at 148° F. for a sufficient period of time to effect a weight loss of 17.5%. The dried strips were then parfried for 50 seconds at 370° F., precooled with ambient air, and frozen.

In Test 1B, the potato strips were processed into par fries having a batter coating but no hydrocolloid coating. That is, the blanched strips were processed following the procedure used in Test 1A, with the exception that the blanched strips were immersed in an aqueous solution containing 0.8 percent tetrasodium pyrophosphate (TSPP), 0.4 percent sodium acid pyrophosphate and 0.2 percent dextrose, with the aqueous solution having a pH in the range of between 5.0 and 8.5, and the strips, after drying, were coated with an aqueous starch slurry. To provide the coating, the dried strips were immersed in an aqueous starch-based slurry, which was prepared by mixing dry batter blend LS-C, supplied by Bunge Foods Corporation, Bradley, Ill., with sufficient water (65° F.) to provide a slurry having a solids content of 30%. LS-C batter contains modified food starch, rice flour, salt, leavening (sodium acid pyrophosphate and sodium bicarbonate),cornstarch, xanthan gum, beta carotene and whey. The batter coated strips were drained to remove excess slurry, parfried for 50 seconds at 370° F., precooled with ambient air and frozen.

In Test 1C, the potato strips were processed into par fries having a hydrocolloid coating on the surface of the strips but no batter coating. That is, the blanched strips were processed following the procedure used in Test 1A, with the single exception that the strips were immersed for 40 seconds in an aqueous hydrocolloid solution (160° F.) having a pH in the range of 5.0 to 8.5 containing 7.0 percent by weight potato maltodextrin, 0.8 percent by weight tetrasodium pyrophosphate (TSPP), 0.4 percent by weight sodium acid pyrophosphate (SAPP), and 0.2 percent by weight dextrose. After immersion, the strips were dried, par fried, cooled and frozen in accordance with the procedure described for Test 1A.

In Test 1D, the potato were processed in accordance with the present invention, with the potato strips having both an initial hydrocolloid coating and a subsequent starch-based batter coating. That is, the blanched potato strips were immersed for 40 seconds in an aqueous hydrocolloid solution containing 1.0 percent by weight potato maltodextrin, 0.8 percent by weight tetrasodium pyrophosphate, 0.4 percent by weight sodium acid pyrophosphate, and 0.2 percent by weight dextrose. The strips were then dried at 148° F. for a sufficient time to effect a weight loss of 17.5%, and the dried strips were immersed in an aqueous starch-based slurry, which was prepared by mixing dry batter blend LS-C, supplied by Bunge Foods Corporation, Bradley, Ill., with sufficient water (65° F.) to provide a slurry having a solids content of 10%. The batter-coated strips were then drained, par fried for 50 seconds at 375° F., precooked with ambient air and frozen.

Frozen samples of products of each of the four tests described above were prepared for evaluation by finish frying 1.5 pounds of each test product in hot oil for 2.5 minutes at 350° F. and holding the finish fried potato strips under a heat lamp at about 160° F. before evaluating the strips for texture. Samples of each Test product were evaluated by a sensory panel at 4 minutes, 10 minutes and 20 minutes after finish frying. In evaluating the quality of french fries, crispness and tenderness, although difficult to quantify, are important characteristics. A lack of crispness typically identifies a product which is tough and chewy. Crispness and tenderness in french fries are characteristics which indicate the ability of the product to sufficiently resist the initial bite but then disappear with a quick meltaway in the mouth. If the potato strip does not readily break down during subsequent mastication, it is considered to have undesirable tough and chewy characteristics. The results of this evaluation are set out below.

Initially, upon removal from the finish fryer, all test samples were golden brown in color, with a crisp and tender outer surface. It should be noted that commercially-available batters such as the LS-C batter used in this series of tests are intended to be used at a solids level of 30% or more, and do not adhere well to a food substrate when applied at low concentrations. However, in the present Test 1 D, the batter adhered well to the potato strips, even though a batter concentration of 10% was used.

AFTER 4 MINUTE HOLD

Test 1A samples (no hydrocolloid coating, no batter coating) were moderately crisp and tender, and were slightly limp with some soft centers.

Test 1B samples (no hydrocolloid coating, batter coating only) were very crisp but slightly hard; some separation of batter coating from the strips.

Test 1C samples (only hydrocolloid coating, no batter) were moderately crisp and tender.

Test 1D samples (hydrocolloid coating and batter coating) were very crisp and tender.

AFTER 10 MINUTE HOLD

Test 1A samples were slightly crisp and tender, and had become moderately limp

Test 1B samples were crisp and tender but the separation of batter coating from the strips was more pronounced.

Test 1C samples were moderately crisp and tender, but becoming slightly limp.

Test 1D samples were crisp and tender with very slight amount of limpness beginning to develop.

AFTER 20 MINUTE HOLD

Test 1A sample were not crisp, but very limp and soggy.

Test 1B samples were slightly crisp and tender, slightly limp; batter coating separation evident.

Test 1C samples were slightly crisp and tender, with slight to moderate limpness.

Test 1D samples were crisp and tender with a few slightly limp strips.

The results of these tests clearly establish that the present invention results in the production of french fries that stay crisp and tender for extended periods of time after finish frying. French fries that had both an initial hydrocolloid coating and a subsequent batter coating were crisper and retained a crisp and tender characteristic longer than corresponding french fries that has neither coating or only one coating.

EXAMPLE II

A series of tests was run to show the effect of different hydocolloids in the present invention. In carrying out these tests, the potatoes were processed in a manner similar to that in Example I, that is, Russet Burbank potatoes were steam peeled, heated for 34 minutes at 117° F., cut into strips 0.30 inches in crossection, water blanched for 6.5 minutes at 180° F. and immersed in an aqueous hydrocolloid solution having a pH in the range of 5.0 to 8.5 for 40 seconds at 160° F. In all of the tests the hydrocolloid solution contained 0.8% TSPP, 0.4% SAPP and 0.2% dextrose, with the following hyrocolloids being included in the solution:

| Test 2A | 5.0% Potato maltodextrin (DE of 6) |
| Test 2B | 1.0% High amylose corn starch |
| Test 2C | 0.5% Corn maltodextrin (DE of 10) |
| Test 2D | 0.5% Tapioca starch |
| Test 2E | 0.3% Methylcellulose gum |

After removal from the solution, the strips were dried in a conventional drier at 148° F. for a sufficient period of time to effect a weight loss of 17.5%. After drying, the potato strips for each test were immersed in an aqueous starch slurry, which was prepared by mixing dry batter blend LS-C, supplied by Bunge Foods Corporation, Bradley, Ill., with sufficient water (65° F.) to provide a slurry having a solids content of 30%. The batter coated strips were drained to remove excess slurry, parfried for 50 seconds at 370° F., precooled with ambient air and frozen.

Frozen samples of products of each of the four tests described above were prepared for evaluation by finish frying 1.5 pounds of each test product in hot oil for 2.5 minutes at 350° F. and holding the finish fried potato strips under a heat lamp at about 160° F. before evaluating the strips for texture. Samples of each Test product were evaluated by a sensory panel at 10 minutes after finish frying. The results of this evaluation are set out below.

| Sample | Evaluation Results |
| --- | --- |
| 2A | Very crisp and tender, not tough or chewy |
| 2B | Very crisp and tender, not chewy |
| 2C | Crisp and tender; did not become chewy over time |
| 2D | Crisp and tender; did not become chewy over time |
| 2E | Quite crisp with some excessive browning |

As shown by these test results, all of the hydrocolloids used in this test were effective in producing french fries which had extended holding qualities and remained crisp and tender for extended periods after finish frying.

EXAMPLE III

A series of tests was run to show the effect of varying the concentration of the starch-based batter, both with and without an initial hydrocolloid coating, on the holding quality of par fried potato strips after finish frying. That is, potato strips, having an initial hydrocolloid coating were contacted with aqueous starch slurries having a solids content of 20%, 30% and 40%, and these tests were then repeated with the exception that the potato strips did not have a hydocolloid coating when contacted with the starch slurries.

Each of these tests utilized potato strips which had been water blanched for 7 minutes at 180° F. and immersed in an aqueous solution for 40 sec. at 160° F. In tests 3A, 3B and 3C the aqueous solution contained 6.0% potato maltodextrin (DE 6), 0.5% SAPP and 0.2% dextrose. In tests 3D, 3E and 3F, the aqueous solution contained 0.5% SAPP and 0.2% dextrose, but no potato maltodextrin or other hydrocolloid. After immersion in the aqueous solution the potato strips were dried in heated air for a period of time sufficient to reduce the weight of the strips by about 18%. The strips were then sprayed with an aqueous starch slurry, formed using Batter Mix 963–5179, supplied by Griffith Laboratories, Alsip, Ill., which contained modified food starch, rice flour, corn starch, dextrin potato starch, leavening, wheat starch, whey, partially hydrogenated soybean oil and flavoring, with sufficient water to provide an aqueous starch slurry having the desired solids content. In these tests, the solids concentration of the slurry was varied from 20% to 40%. The conditions used are set out below, with viscosity being determined using a Stein cup.

| Test | Hydrocolloid | Batter Solids (%) | Viscosity (sec.) | Batter Pick-Up (%) |
|---|---|---|---|---|
| 3A | 6.0% | 20% | 6.4 | 10.1 |
| 3B | 6.0% | 30% | 6.5 | 10.8 |
| 3C | 6.0% | 40% | 7.4 | 12.1 |
| 3D | 0.0% | 20% | 6.4 | 7.6 |
| 3E | 0.0% | 30% | 6.5 | 5.0 |
| 3F | 0.0% | 40% | 7.4 | 6.3 |

The batter coated strips were drained, par fried for 45 seconds at 370 F. air cooled and frozen. Frozen samples of products of each of the tests described above were prepared for evaluation by finish frying 1.5 pounds of each test product in hot oil for 2.5 minutes at 350° F. and holding the finish fried potato strips under a heat lamp at about 160° F. before evaluating the strips for texture. Samples of each Test product were evaluated by a sensory panel at 10 minutes after finish frying. The results of this evaluation are set out below.

| Test | Hydrocolloid (%) | Batter Solids (%) | Evaluation |
|---|---|---|---|
| 3A | 6.0 | 20 | crisp and tender |
| 3B | 6.0 | 30 | crisp and slightly chewy |
| 3C | 6.0 | 40 | crisp and moderately chewy |
| 3D | 0.0 | 20 | less crisp and more chewy than 3A |
| 3E | 0.0 | 30 | less crisp and more chewy than 3B |
| 3F | 0.0 | 40 | less crisp and more chewy than 3C |

As shown in these tests, french fries produced using batter coatings having a solids content of up to 40%, when applied after an initial hydrocolloid coating, exhibit desired crispness after extended periods after finish frying. However, the french fries become more chewy as the batter concentration increases from 20% to 40%. All samples produced using no hydrocolloid layer before the batter coating were inferior to the samples produced using both an initial hydrocolloid layer and a batter layer.

While the present invention has been described by reference to specific embodiments, it will be apparent to those skilled in the art that other alternative embodiments or modifications may be employed without departing from the scope of this invention.

What is claimed is:

1. Frozen par-fried potato strips having a dual coating on the strips consisting essentially of a coating of a hydrocolloid layer on the surface of the strips and a separate and distinct starch-based batter coating over and adhered to the hydrocolloid layer.

2. The par-fried potato strips defined in claim 1 in which the hydrocolloid layer is deposited on the surface of the potato strips by immersing the potato strips in an aqueous solution containing a hydrocolloid selected from the group consisting of food gums, gelatin, pectins, starches, modified starches, high amylose starches, dextrins, maltodextrins, and combinations thereof.

3. The par-fried potato strips defined in claim 1 in which the starch-based coating is deposited by immersing partially dried potato strips having a set hydrocolloid layer on the surface thereof in an aqueous starch-based batter.

4. The par-fried potato strips defined in claim 3 in which the aqueous batter contains one or more starches and flours selected from the group consisting of corn flour, wheat flour, rice flour, dextrin, starch, modified food starch and mixtures thereof.

5. The par-fried potato strips defined in claim 3 in which the aqueous starch-based batter has a solids content as low as about 5% by weight.

* * * * *